(12) United States Patent
Rizzolatti et al.

(10) Patent No.: US 12,719,360 B2
(45) Date of Patent: Aug. 25, 2026

(54) POWER CONVERTER WITH MULTI-TAPPED AUTOTRANSFORMER

(71) Applicant: Infineon Technologies Austria AG, Villach (AT)

(72) Inventors: Roberto Rizzolatti, Villach (AT); Mario Ursino, Villach (AT)

(73) Assignee: Infineon Technologies Austria AG, Villach (AT)

( * ) Notice: Subject to any disclaimer, the term of this patent is extended or adjusted under 35 U.S.C. 154(b) by 202 days.

(21) Appl. No.: 18/539,913

(22) Filed: Dec. 14, 2023

(65) Prior Publication Data

US 2025/0202353 A1 Jun. 19, 2025

(51) Int. Cl.

*H02M 3/07* (2006.01)
*H01F 30/02* (2006.01)
*H02M 3/155* (2006.01)
*H02M 3/158* (2006.01)

(52) U.S. Cl.

CPC ............ *H02M 3/155* (2013.01); *H01F 30/02* (2013.01); *H02M 3/07* (2013.01)

(58) Field of Classification Search

CPC .. H02M 1/0003; H02M 1/083; H02M 1/0064; H02M 3/1586; H02M 3/33573; H02M 3/07–078; H02M 3/01

See application file for complete search history.

(56) References Cited

U.S. PATENT DOCUMENTS

2021/0288576 A1* 9/2021 Rizzolatti ............. H02M 1/007
2022/0224231 A1* 7/2022 Rizzolatti ............... H02M 3/07
2022/0263410 A1* 8/2022 Saggini ................... H02M 3/07
2023/0261571 A1* 8/2023 Ursino ................ H02M 1/0074
323/282
2023/0353036 A1* 11/2023 Rizzolatti ........... H02M 1/0095
2023/0353058 A1* 11/2023 Rizzolatti ............ H02M 3/155
2024/0223089 A1* 7/2024 Ursino ................ H01F 27/2804
2024/0223091 A1* 7/2024 Saggini ............... H02M 1/0064
2024/0223092 A1* 7/2024 Ursino ................ H02M 1/0058

* cited by examiner

*Primary Examiner* — Sisay G Tiku

(74) *Attorney, Agent, or Firm* — Armis IP Law, LLC

(57) ABSTRACT

A power converter includes an autotransformer, first switches, and second switches. The autotransformer includes multiple windings. The first switches are coupled between an input node and an output node of the power converter. The second switches are coupled between a reference potential and the output node. Yet further, the first switches are operable to control switching of circuit paths including the multiple windings of the autotransformer. The second switches are operable to convey currents from the multiple windings of the autotransformer through the second switches to the output node.

25 Claims, 13 Drawing Sheets

POWER SUPPLY 100
121
120
Vin
CTLR 140
105-1 (S1)
105-2 (S2)
Q1, Q3, Q6, Q8
Q2, Q4, Q5, Q7
N1
N2
Q1
Q2
Q3
Q4
Q5
Q6
Q7
Q8
S1
S2
D
G
S
N11
N21
N12
N22
PH1
N31
PH2
N32
Icres1
Icres2
iout1
iout2
CRES1
CRES2
N41
N42
N51
N52
161-1
161-2
160
162
isec
N23
iout
C9
118

POWER CONVERTER WITH MULTI-TAPPED AUTOTRANSFORMER

BACKGROUND

Data centers are necessary to provide many services. The energy consumption for all data centers worldwide is around 2% of all energy usage. Therefore, data center providers are continuously looking to improve the efficiency of power conversion in order to save energy or to be able to increase the CPU/GPU/ASIC etc. power of serves in existing data centers. Machine learning and artificial intelligent require very powerful GPUs or custom designed ASICS to fulfil the required calculation power.

Nowadays, most digital loads are powered from a 12 VDC bus directly with a single stage multiphase buck topology, so called voltage regulator module (VRM). However, with the increase of power demand at digital load, conduction losses at 12 VDC bus bar are becoming an undesirable bottleneck. This has resulted in a 48 VDC architecture being proposed to provide power.

Operating a system with 40 V to 60 VDC input voltage bus instead of 12 VDC bus offers serval advantages.

For example, the first stage of a conventional power converter is typically configured to convert the high input voltage (48 volt DC) down to an intermediate voltage. This first stage can be an unregulated or regulated, high-efficiency power converter and that provides down conversion of the input voltage to an intermediate voltage input into a so called intermediate bus power converter (IBC). The second stage can be based on the common buck converter with very good transient response and high efficiency.

BRIEF DESCRIPTION

This disclosure includes the observation that power conversion efficiency of conventional switched-capacitor converters can be improved. For example, to this end, examples herein include novel ways of providing improved performance of a switched-capacitor converter and efficient generation of a corresponding output voltage.

More specifically, according to one example, an apparatus such as a power converter or other suitable entity as discussed herein includes an autotransformer, first switches, and second switches. The autotransformer includes multiple windings. The first switches are coupled between an input node and an output node of the apparatus. The second switches are coupled between a reference potential and the output node. The first switches are operable to control switching of circuit paths including the multiple windings of the autotransformer; the second switches are operable to convey currents from the multiple windings of the autotransformer through the second switches to the output node.

In one example, the currents as previously discussed are first currents. Note further that the first switches can be configured to convey second currents from the autotransformer through the first switches to the output node.

In accordance with further examples, the second switches include a first pair of switches disposed in series and a second pair of switches disposed in series; the first pair of switches may be disposed in series between the reference potential and the output node; the second pair of switches may be disposed in series between the reference potential and the output node.

The currents as discussed herein may include a first current and a second current. The first pair of switches may be configured to control conveyance of the first current from the multiple windings of the autotransformer to the output node; the second pair of switches may be configured to control conveyance of the second current from the multiple windings of the autotransformer to the output node.

In accordance with another example, the input node of the apparatus can be configured to supply an input voltage to the first switches. The first switches can be configured to include a first switch and a second switch; the first switch may be disposed between the input node and a first circuit path, the first circuit path including a first primary winding of the autotransformer; the second switch may be disposed between the input node and a second circuit path including a second primary winding of the autotransformer, the second primary winding magnetically coupled to the first primary winding. The autotransformer may further include a secondary winding magnetically coupled to both the first primary winding and the second primary winding; the first circuit path may extend between the first switch and a first node of the secondary winding of the autotransformer. The second circuit path extends between the second switch and a second node of the secondary winding of the autotransformer. The second switches may include a third switch and a fourth switch. The third switch may be coupled between the first node of the secondary winding and the output node, the third switch can be configured to control conveyance of a first current of the currents from the first node of the secondary winding to the output node. The fourth switch may be coupled between the second node of the secondary winding and the output node, the fourth switch can be configured to control conveyance of second current of the currents from the second node of the secondary winding to the output node.

Yet further, the apparatus as discussed herein can be configured to include a controller operative to: for a first portion of a respective control cycle of multiple control cycles: i) activate the first switch, activation of the first switch operative to convey the input voltage from the input node through the first switch to the first circuit path, and ii) deactivate the second switch, deactivation of the second switch operative to prevent conveyance of the input voltage through the second switch to the second circuit path; and for a second portion of the respective control cycle of multiple control cycles: i) deactivate the first switch, deactivation of the first switch operative to prevent conveyance of the input voltage through the first switch to the first circuit path, and ii) activate the second switch, activation of the second switch operative to convey the input voltage from the input node through the second switch to the second circuit path.

Still further, the first switches as discussed herein may include a fifth switch and a sixth switch. The fifth switch may be coupled to the first circuit path and the first switch; the sixth switch may be coupled to the second circuit path and the second switch.

The controller can be configured to: for the first portion of the control cycle, deactivate the fifth switch and activate the sixth switch, the activation of the sixth switch operable to convey the second current from the second circuit path through the sixth switch to the output node; and for the second portion of the control cycle, deactivate the sixth switch and activate the fifth switch, the activation of the fifth switch operable to convey the first current from the first circuit path through the fifth switch to the output node.

Note further that the multiple windings of the autotransformer may include multiple primary windings and a secondary winding. The second switches may include a first switch and a second switch. The first switch may be directly coupled to a first node of the secondary winding, the second switch may be directly coupled to a second node of the secondary winding. The currents as discussed herein may include first current and second current. The apparatus may further include a controller operable to switch between: i) in a first portion of a respective control cycle, activation of the first switch to convey the first current from the first node of the secondary winding through the first switch to the output node, and ii) in a second portion of the respective control cycle, activation of the second switch to convey the second current from the second node of the secondary winding through the second switch to the output node.

In accordance with still further examples, the second switches may include a third switch and a fourth switch. The third switch may be directly coupled to the first node of the secondary winding, the third switch may be directly coupled to the first switch and disposed in series with the first switch. The fourth switch may be directly coupled to the second node of the secondary winding, the fourth switch may be directly coupled to the second switch and disposed in series with the second switch.

Still further, the controller may be further operable to: i) activate the fourth switch in the first portion of the respective control cycle, activation of the fourth switch operable to connect the second node of the secondary winding to the reference potential; and ii) activate the third switch in the second portion of the respective control cycle, activation of the third switch operable to connect the first node of the secondary winding to the reference potential.

In accordance with another example, the apparatus as discussed herein can be configured to include multiple capacitors such as including a first capacitor and a second capacitor. The circuit paths may include a first resonant circuit path and a second circuit resonant path, the first resonant circuit path including the first capacitor and a first primary winding of the autotransformer disposed in series, the second resonant circuit path including the second capacitor and a second primary winding of the autotransformer disposed in series. The autotransformer may further include a secondary winding, the secondary winding including a first node and a second node, the first node may be directly coupling the first primary winding to the secondary winding, the second node may be configured to directly couple the second primary winding to the secondary winding. The second switches may include a first switch and a second switch; the first switch may be coupled between the first node of the secondary winding and the output node; the second switch may be coupled between the second node of the secondary winding and the output node.

The autotransformer may be a matrix multi-tapped autotransformer.

Yet further, the autotransformer may include a first primary winding connected between a first node and a second node of the autotransformer. The autotransformer may include a secondary winding connected between the second node and a third node of the autotransformer. The autotransformer may include a second primary winding connected between the third node and a fourth node of the autotransformer. The second switches may include a first switch and a second switch. The currents as described herein may include a first current and a second current. The first switch may be operable to control conveyance of the first current from the second node of the autotransformer through the first switch to the output node; the second switch may be operable to control conveyance of the second current from the third node of the autotransformer through the second switch to the output node.

In accordance with yet further examples, the apparatus as discussed herein can be configured to include a controller operative to: for a first portion of a control cycle: i) activate the first switch to an ON state, ii) deactivate the second switch to an OFF state, and iii) directly couple the third node of the autotransformer to the reference potential; and for a second portion of the control cycle: i) activate the second switch to an ON state, ii) deactivate the first switch to an OFF state, and iii) directly couple the second node of the autotransformer to the reference potential.

In accordance with another example, the apparatus may include: an autotransformer including primary windings and a secondary winding; multiple switches including a first switch, a second switch, a third switch, and a fourth switch; multiple nodes including: i) a first node directly coupling the first switch and the second switch in series, and ii) a second node directly coupling the third switch and the fourth switch in series; wherein the secondary winding may be connected between the first node and the second node; and an output node operative to output an output current based on: i) first output current supplied from the first node through the first switch, and ii) second output current supplied from the second node through the third switch.

Still further, the apparatus as discussed herein can be configured to include: a fifth switch and a sixth switch; wherein the first switch may be disposed in series between the fifth switch and the second switch; and wherein the third switch may be disposed in series between the sixth switch and the fourth switch.

Yet further, the apparatus as discussed herein can be configured to include: a first circuit path extending between the fifth switch and the first node, the first circuit path including a first capacitor disposed in series with a first primary winding of the autotransformer; and a second circuit path extending between the sixth switch and the second node, the second circuit path including a second capacitor disposed in series with a second primary winding of the autotransformer.

Still further, the apparatus as discussed herein can be configured to include a controller operative to: for a first portion of a control cycle: i) activate the first switch to an ON state, ii) deactivate the third switch to an OFF state, and iii) activate the fourth switch to directly couple the second node to a reference voltage; and for a second portion of a control cycle: i) activate the third switch to an ON state, ii) deactivate the first switch to an OFF state, and iii) activate the second switch to directly couple the first node to the reference voltage.

In accordance with another example, the controller may be configured to: for the first portion of the control cycle: i) activate the sixth switch to an ON state, ii) deactivate both the second switch and the fifth switch to an OFF state; and for the second portion of the control cycle: i) activate the fifth switch to an ON state, ii) deactivate both the fourth switch and the sixth switch to an OFF-state.

Note further that this disclosure also includes a method of fabricating the power converter as previously discussed. The method includes a fabricator resource receiving an autotransformer including multiple windings. The fabricator resource fabricates the power converter to include the autotransformer. Additionally the fabricator resource fabricates the power converter to include first switches, and second switches. The first switches are operable to control switching of circuit paths including the multiple windings; the second switches are operable to convey output current from the autotransformer to an output node to power a load. Note that further possible method operations are discussed herein.

Accordingly, implementations as discussed herein are useful over conventional techniques. For example, in contrast to conventional techniques, the novel power converter provides efficient conversion of an input voltage to a respective output voltage. Such examples as discussed herein provide lower loss of energy during generation of a respective output voltage.

These and other more specific examples are disclosed in more detail below.

Note that any of the resources as discussed herein can include one or more computerized devices, apparatus, hardware, etc., that execute and/or support any or all of the method operations disclosed herein. In other words, one or more computerized devices or processors can be programmed and/or configured to operate as explained herein to carry out the different examples as described herein.

Yet other examples herein include software programs to perform the steps and/or operations summarized above and disclosed in detail below. One such example comprises a computer program product including a non-transitory computer-readable storage medium (i.e., any computer readable hardware storage medium) on which software instructions are encoded for subsequent execution. The instructions, when executed in a computerized device (hardware) having a processor, program and/or cause the processor (hardware) to perform the operations disclosed herein. Such arrangements are typically provided as software, code, instructions, and/or other data (e.g., data structures) arranged or encoded on a non-transitory computer readable storage medium such as an optical medium (e.g., CD-ROM), floppy disk, hard disk, memory stick, memory device, etc., or other medium such as firmware in one or more ROM, RAM, PROM, etc., or as an Application Specific Integrated Circuit (ASIC), etc. The software or firmware or other such configurations can be installed onto a computerized device to cause the computerized device to perform the techniques explained herein.

Accordingly, examples herein are directed to a method, system, computer program product, etc., that supports operations as discussed herein.

One example includes a computer readable storage medium and/or system having instructions stored thereon to facilitate generation of an output voltage to power a load. The instructions, when executed by computer processor hardware, cause the computer processor hardware (such as one or more co-located or disparately located processor devices or hardware) to control operation of the power converter and corresponding switches to convert a respective input voltage into an output voltage power load.

The ordering of the steps above has been added for clarity sake. Note that any of the processing steps as discussed herein can be performed in any suitable order.

Other examples of the present disclosure include software programs and/or respective hardware to perform any of the method example steps and operations summarized above and disclosed in detail below.

It is to be understood that the system, method, apparatus, instructions on computer readable storage media, etc., as discussed herein also can be embodied strictly as a software program, firmware, as a hybrid of software, hardware and/or firmware, or as hardware alone such as within a processor (hardware or software), or within an operating system or a within a software application.

Note further that although examples as discussed herein are applicable to controlling operation of a switched-capacitor converter, the concepts disclosed herein may be advantageously applied to any other suitable voltage converter topologies.

Additionally, note that although each of the different features, techniques, configurations, etc., herein may be discussed in different places of this disclosure, it is intended, where suitable, that each of the concepts can optionally be executed independently of each other or in combination with each other. Accordingly, the one or more present inventions as described herein can be embodied and viewed in many different ways.

Also, note that this preliminary discussion of examples herein (BRIEF DESCRIPTION OF EXAMPLES) purposefully does not specify every example and/or incrementally novel aspect of the present disclosure or claimed invention(s). Instead, this brief description only presents general examples and corresponding points of novelty over conventional techniques. For additional details and/or possible perspectives (permutations) of the invention(s), the reader is directed to the Detailed Description section (which is a summary of examples) and corresponding figures of the present disclosure as further discussed below.

Figure 1:
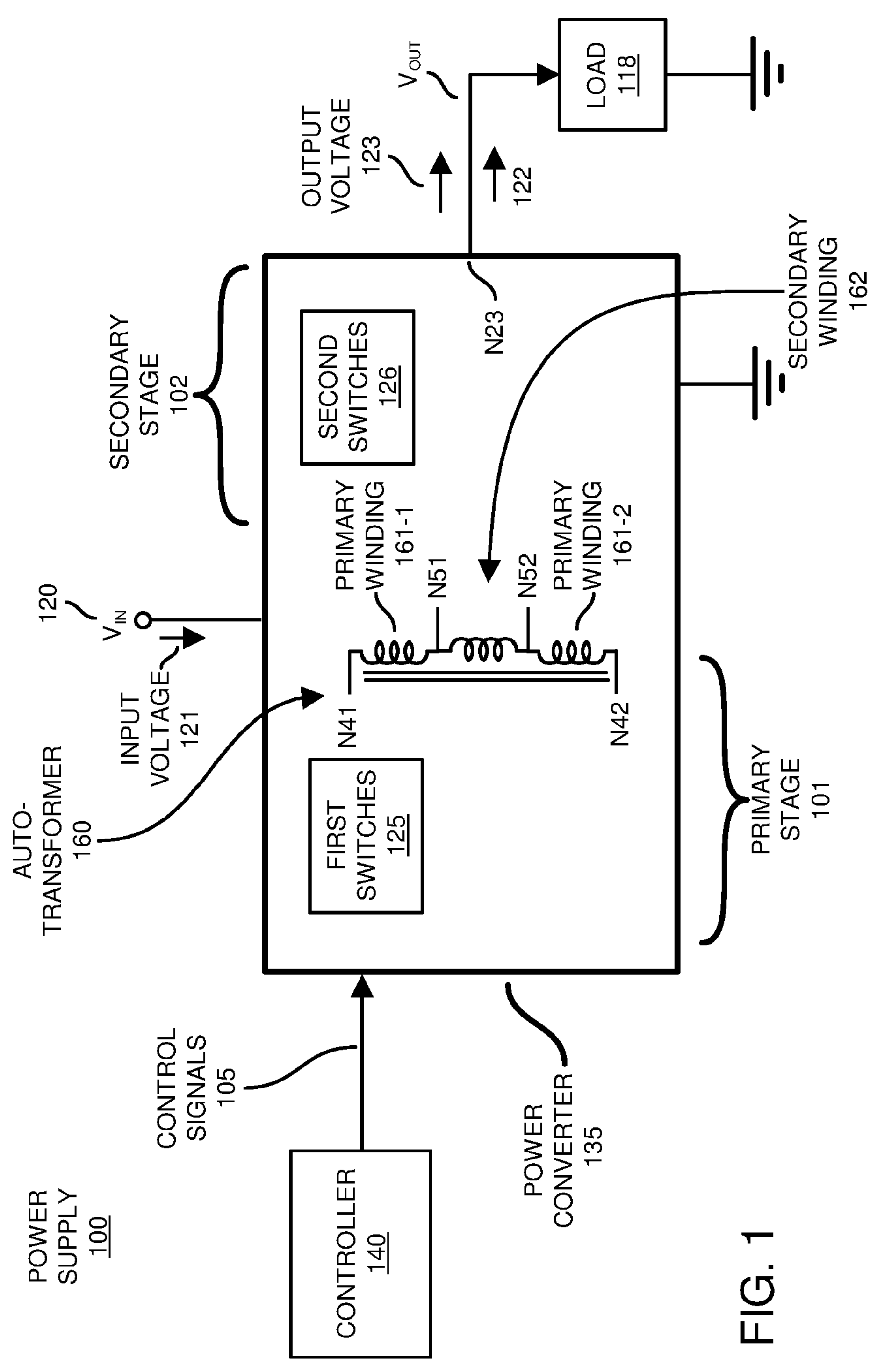
FIG. 1 is an example diagram illustrating a power supply including a switched-capacitor converter and autotransformer as discussed herein.

The foregoing and other objects, features, and advantages of examples herein will be apparent from the following more particular description herein, as illustrated in the accompanying drawings in which like reference characters refer to the same parts throughout the different views. The drawings are not necessarily to scale, with emphasis instead being placed upon illustrating the examples, principles, concepts, etc.

DETAILED DESCRIPTION

According to one example, as further discussed herein, an apparatus such as a power converter including an autotransformer, first switches, and second switches. The autotransformer includes multiple windings. The first switches control switching of circuit paths including the multiple windings of the autotransformer. The second switches control conveyance of convey output current from the multiple windings of the autotransformer to an output node to power a load.

Now, more specifically, FIG. 1 is an example diagram illustrating a power supply including a switched-capacitor converter as discussed herein.

As shown in this example, power supply 100 (such as an apparatus, electronic device, etc.) includes a controller 140 and power converter 135. The power converter 135 includes a primary stage 101, autotransformer 160, and a secondary stage 102.

Primary stage 101 includes switches 125. The secondary stage 102 includes the second switches 126.

The autotransformer 160 includes multiple primary windings and at least one secondary winding. For example, the autotransformer 160 includes primary winding 161-1 and primary winding 161-2. The autotransformer 160 also includes the secondary winding 162.

Note that the multi-tapped autotransformer 160 is shown by way of a non-limiting example and can be instantiated as any suitable device such as a transformer, transformer device, transformer apparatus, etc.

Note further that each of the resources as described herein can be instantiated in any suitable manner. For example, each of the controller 140, power converter 135, multi-tapped autotransformer 160, etc., can be instantiated as or include hardware (such as circuitry), software (executable instructions), or a combination of hardware and software resources.

Note that the controller 140 and corresponding operations can be implemented as controller software, controller hardware, or a combination of controller software and controller hardware.

During operation, controller 140 produces control signals 105 (such as one or more pulse width modulation signals) that control states of respective control of switches 125 and switches 126 in the power converter 135.

As further shown, the power converter 135 such as a switched-capacitor converter receives the input voltage 121 (Vin, such as a DC input voltage) supplied from input voltage source 120. As previously discussed, the multi-tapped autotransformer 160 includes a first primary winding 161-1 and a second primary winding 161-2. In one example, the primary windings 161 are at least inductively coupled to the secondary winding 162 and each other. In accordance with further examples, the primary windings 161 are connected in series with the secondary windings 162.

As further discussed herein, controller 140 of the power supply 100 controllably switches multiple capacitors and corresponding resonant circuit paths including the primary windings of multi-tapped autotransformer 160 (such as a matrix multi-tapped autotransformer or other suitable type of component) to convey energy from the input voltage (Vin) through the primary winding 161 to the secondary winding 162 to produce the output voltage 123 and corresponding output current 122 to power the load 118.

Accordingly, an apparatus such as a power converter 135 as described herein can be configured to include an autotransformer 160, first switches 125, and second switches 126. The autotransformer 160 includes multiple windings such as the series connectivity of the primary winding 161-1, secondary winding 162, and the primary winding 161-2. The first switches 125 can be configured to control switching of circuit paths including the multiple windings such as the primary winding 161-1 and the primary winding 161-2 of the autotransformer 160. The second switches 126 can be configured to control conveyance of the output voltage 123 and the corresponding output current 122 from the one or more windings of the autotransformer 160 to an output node N23 to power a load 118.

As previously discussed, the multiple windings of the autotransformer 160 can be configured to include a first primary winding 161-1, a second primary winding 161-2, and a secondary winding 162. Each of the multiple windings (such as the primary winding 161-1, secondary winding 162, and the primary winding 161-2) in the autotransformer are magnetically (inductively) coupled to each other. As further shown in this example, the secondary winding 162 is disposed in series between the first primary winding 161-1 and the second primary winding 161-2. For example, the primary winding 161-1 is connected between node N41 and node N51; the secondary winding 162 is connected between node N51 and node N52; the primary winding 161-2 is connected between the node N52 and node N42.

The secondary winding 162 may be a single secondary winding of the autotransformer 162 disposed in series between the first primary winding 161-1 and the second primary winding 161-2. Each of the windings in the transformer 160 can be one or more windings disposed in parallel.

Figure 2:
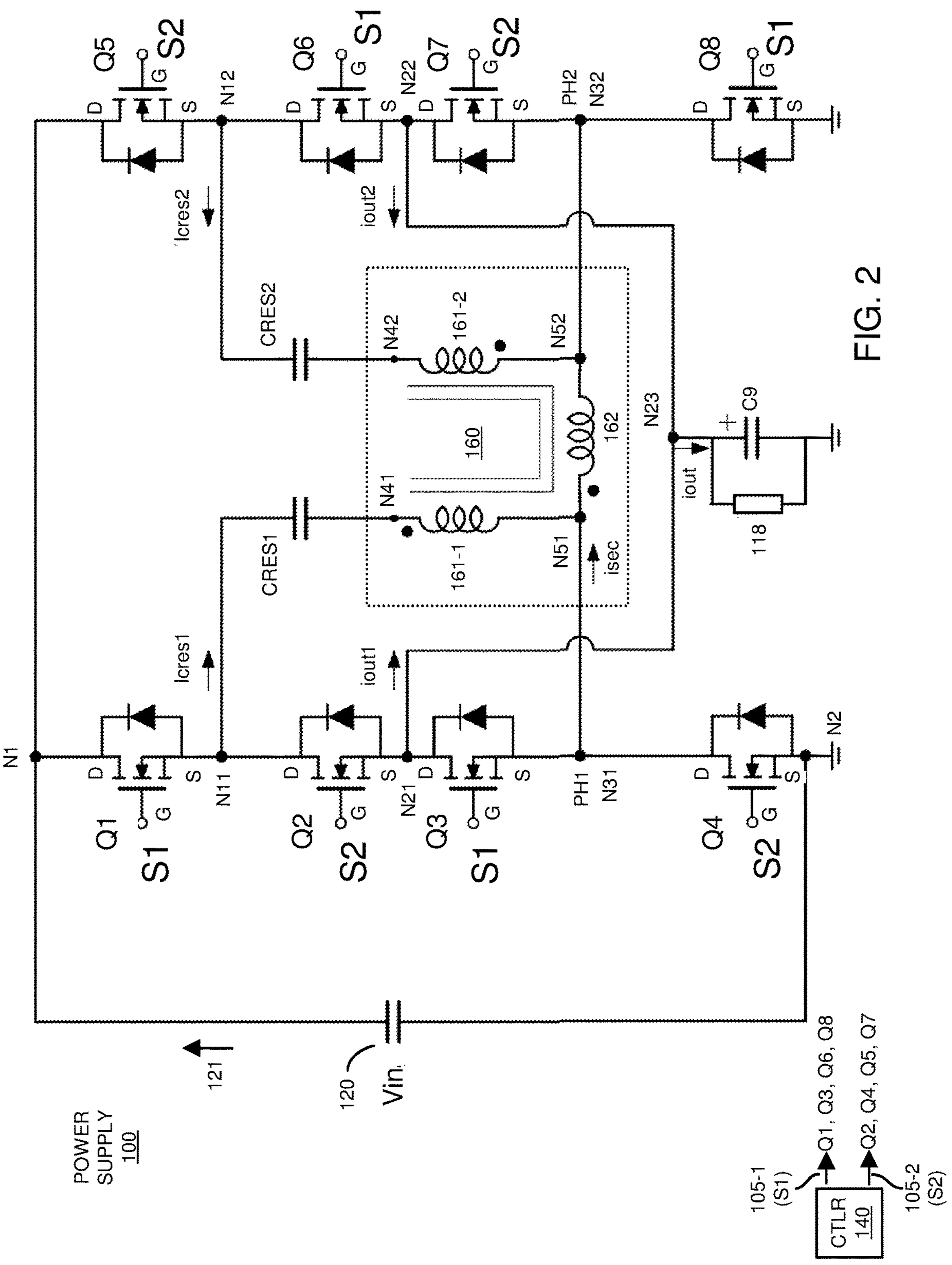
FIG. 2 is an example more detailed diagram illustrating a power converter as discussed herein.

FIG. 2 is an example diagram illustrating a switched-capacitor converter according to examples herein.

As shown, the power supply 100 in this example includes input voltage source 120 such as providing input voltage 121 (Vin) to the node N1 of the power converter 135.

The power converter 135 (apparatus such as hardware, circuitry, etc.) includes multiple switches Q1, Q2, Q3, Q4, Q5, Q6, Q7, and Q8 (such as field effect transistors or any other suitable type of switch) to control conveyance of current. Additionally, the power converter 135 includes multiple circuit components including capacitor Cres1 and capacitor Cres2.

As further shown, the power converter 135 includes a first resonant circuit path including a series connectivity of the capacitor Cres1 and the primary winding 161-1 connected in series between the node N11 and node N51. Additionally, the power converter 135 includes a second resonant circuit path including a series connectivity of the capacitor Cres2 and the primary winding 161-2 connected in series between the node N12 and node N52.

Further in this example, the windings in the multi-tapped autotransformer 160 can include any number of turns. For example, the autotransformer 160 can be configured to include primary winding 161-1 (such as N1 turns), primary winding 161-2 (such as N1 turns), and secondary winding 162 (such as N2 turns). Note that the number of windings (N1, N2, etc.) associated with the primary windings 161 and/or the secondary winding 162 can be any suitable value and vary depending on the example.

As further shown, the switches Q1, Q2, Q3, and Q4 are connected in series between the node N1 (such as the node of the power supply 120 that supplies the input voltage 121) and the node N2 (such as a ground reference potential).

Further in this example, the drain node (D) of switch Q1 and the drain node (D) of switch Q5 are connected to the input voltage source Vin for node N1. Further, the source node(S) of the switch Q1 is coupled to the drain node (D) of the switch Q2 (node N11). The source node(S) of the switch Q2 is coupled to the drain node (D) of the switch Q3 (at node N21). The source node(S) of the switch Q3 is coupled to the drain node (D) of the switch Q4 (at node N31 which is the same as node PH1). Finally, the source node of the switch Q4 is connected to the node N2.

Capacitor Cres1 is connected between node N11 and a respective node N41 of the primary winding 161-1. Capacitor Cres2 is connected between node N12 and a respective node N42 of the primary winding 161-2.

The settings of capacitors Cres1 and Cres2 can be any suitable capacitance value. In one example, the power converter 135 as described herein provides better performance when capacitance of Cres1=capacitance of Cres2, where the power converter 135 also works well even if capacitance of Cres1≠capacitance of Cres2.

Note further that the proposed Hybrid Switched Capacitor converter (such as power converter 135) with full-bridge rectifier (FB-HSC) can be configured to include an interleaved flying capacitor structure connected to a multi-tapped autotransformer (MTA) for full-bridge rectifier as shown in FIG. 2. Zero-voltage switching (ZVS) for all switches Q1-Q8 may be enabled by the magnetizing inductance of the autotransformer 160. The capacitor CRES1 is a first flying capacitor; the capacitor CRES2 is a second flying capacitor.

The switches Q1-Q8 can be divided into two switch groups: the first switch group is formed by $Q_1$, $Q_3$, $Q_6$ and $Q_8$ (control logic and control signal S1), and the second switch group ($Q_2$, $Q_4$, $Q_5$ and $Q_7$) is commanded by a 180° phase shifted PWM (control logic and control signal S2) with respect to the first group and have the same duty cycle. The power converter 135 can be configured to operate with a fixed duty cycle such as around 50% or any other suitable value to obtain the minimum RMS current.

The magnitude of the output voltage 123 depends on the multi-tapped autotransformer turns ratio (N1/N2). The value N1 represents a number of windings around each of the primary winding 161-1 in the primary winding 161-2. The value N2 represents a number of windings around the secondary winding 162. The ratio between input voltage Vin (121) and output voltage Vout (123) is given by the following equation:

$$\frac{V_{in}}{V_{out}} = 2 + 2\frac{N_1}{N_2}$$

In one example, the proposed FB-HSC such as power converter 135 may be scalable itself to different conversion ratios by designing only the ratio between N1 and N2, which actually leads to claim a new family of unregulated hybrid dc-dc converter with different ratio (i.e. 3 to 1, 4 to 1, 5 to 1, 6 to 1 . . . ).

In one example, the main property of the proposed solution such as power converter 135 is to take advantage of the leakage inductance of the multi-tapped autotransformer 160 to soft charge the resonant capacitor CRES1 and resonant capacitor CRES2, which are actually acting as flying capacitors, enabling use of lower voltage switches (such as MOSFETs) at primary side compared to, for example, a classic LLC (resonant power converter) topology. In this example of the power converter 135, the switches $Q_1$, $Q_2$, $Q_5$ and $Q_6$ block a portion of the input voltage $V_{in}-V_{out}$.

Due to full-bridge rectifier, the actual rectifier switches ($Q_3$, $Q_4$, $Q_7$ and $Q_8$) have to block the output voltage $V_{out}$. This is beneficial because "ultra" low voltage FETs (such as maximum voltage across the drain the source) can be used already in a 6:1 implementation (i.e. 15 V device).

Another benefit of the power converter 135 as discussed herein is the symmetric behavior of same, which results in a reduction of the input voltage ripple.

One enabler for high efficiency and high-power density of the proposed FB-HSC (power converter 135) is the opportunity to use lower voltage rating MOSFETs (such as field effect transistor devices having a lower maximum voltage rating across the respective drain node of the source node) and the opportunity to implement Class II ceramic capacitors such as for CRES1 and CRES2, which inherently offer high capacitance density. Moreover, the magnetizing inductance of the autotransformer 160 provides the inductive energy to ensure ZVS transition for all switches such as field effect transistors (MOSFETs).

Thus, in accordance with the circuit as shown in FIG. 2, the power converter 135 includes the switch $Q_1$ disposed between an input voltage source 120 and a first circuit path such as the series circuit path including the capacitor Cres1 and the primary winding 161-1 of the autotransformer 161. The power converter 135 further includes the switch $Q_5$ disposed between an input voltage source 120 (node N1) and a second circuit path such as the series circuit path including the capacitor Cres2 and the primary winding 161-2 of the autotransformer 161.

As previously discussed, the primary winding 161-1, secondary winding 162, and the primary winding 161-2 are magnetically coupled to each other. In such an instance, therefore, the secondary winding 162 is magnetically coupled to both the first primary winding 161-1 and the second primary winding 161-2.

Yet further, the first resonant circuit path such as including the capacitor CRES1 and the primary winding 161-1 extends between the switch $Q_1$ (and corresponding node N11) and the node N51 of the secondary winding 162 associated with the autotransformer 160; the second resonant circuit path such as including the capacitor CRES2 and the primary winding 161-2 extends between the switch $Q_2$ (and corresponding node N12) and the node N52 of the secondary winding 162 associated with the autotransformer 160.

In this example, the first switches 125 include switches $Q_1$, $Q_2$, $Q_5$, and $Q_6$. The second switches 126 includes switches $Q_3$, $Q_4$, $Q_7$, and $Q_8$.

The combination of the switch $Q_1$, first resonant circuit path (such as capacitor CRES1 and primary winding 161-1), and switch $Q_4$ are disposed between the node N1 and input voltage source 120 and the ground reference node N2. The combination of the switch $Q_5$, second resonant circuit path (such as capacitor CRES2 and primary winding 161-2), and switch $Q_8$ are disposed between the node N1 and input voltage source 120 and the ground reference node N2.

As further shown, the controller produces the control signal 105-1. The control signal 105-1 is inputted to respective gate notes of switch $Q_1$, switch $Q_3$, switch $Q_6$, and switch $Q_8$. For example, the controller 140 supplies the control signal 105-1 (S1) to the gate node of switch $Q_1$, the gate node of switch $Q_3$, the gate node of switch $Q_6$, and the gate node of switch $Q_8$.

The controller 140 produces the control signal 105-2. The control signal 105-2 is inputted to each of the gate nodes associated with switch $Q_2$, switch $Q_4$, switch $Q_5$, and switch $Q_7$. For example, the controller 140 supplies the control signal 105-2 (S2) to the gate node of switch $Q_2$, the gate node of switch $Q_4$, the gate node of switch $Q_5$, and the gate node of switch $Q_7$.

Figure 3:
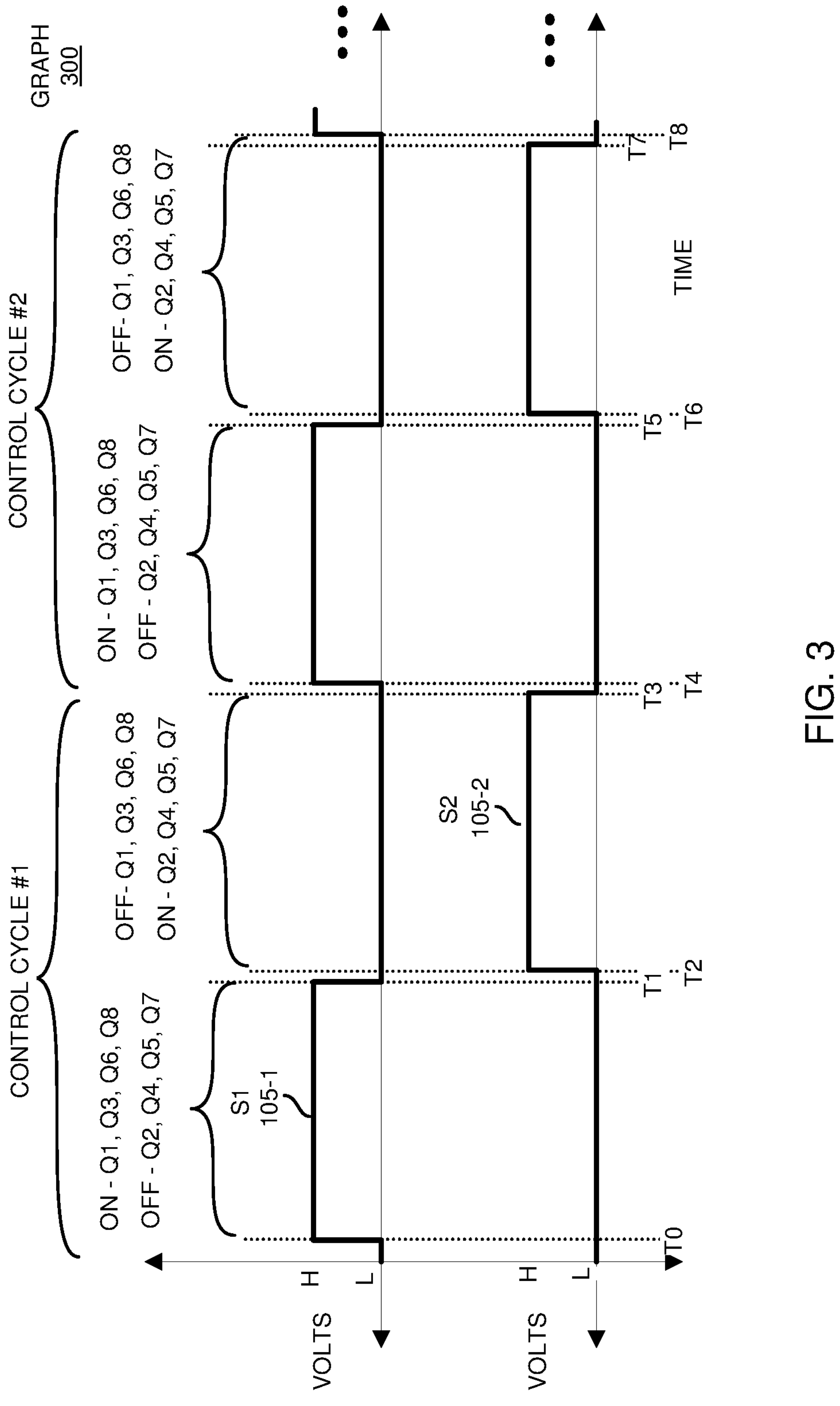
FIG. 3 is an example timing diagram of controlling the power converter as discussed herein.

FIG. 3 is an example timing diagram of controlling the power converter as discussed herein.

In general, as shown in graph 300, the controller 140 produces the control signal 105-2 (a.k.a., signal S2) to be an inversion of control signal 105-1 (a.k.a., signal S1). A pulse width of each control signal is approximately 49% or other suitable pulse width modulation value.

Between time T0 and time T1, when the control signal 105-1 (at a logic high) controls the set of switches $Q_1$, $Q_3$, $Q_6$, and $Q_8$, to an ON state (low impedance or short circuit between the respective drain and source nodes), the control signal 105-2 (logic lo) controls the set of switches $Q_2$, $Q_4$, $Q_5$, and $Q_7$, to an OFF state (very high impedance or open circuit between respective drain and source nodes).

Conversely, between time T2 and time T3, when the control signal 105-2 (logic high) controls the set of switches $Q_2$, $Q_4$, $Q_5$ and $Q_7$, to an ON state, the control signal 105-1 (logic low) controls the set of switches $Q_1$, $Q_3$, $Q_6$ and $Q_8$, to an OFF state.

Note that the duration between times T1 and time T2, the duration between time T3 and time T4, duration between T5 and T6, etc., represents so-called dead times during which each of the switches (Q1-Q8) in the power converter 135 is deactivated to the OFF state.

As further shown, the control signals 105 are cyclical. For example, the settings of control signals 105 (control signal 105-1 and control signal 105-2) for subsequent cycles is the same as those for the cycle between time T0 and time T4. More specifically, the settings of control signals 105 produced by the controller 140 between time T3 and time T7 is the same as settings of control signals 105 between time T0 and time T3, and so on.

In one example, the power converter 135 may be configured to operate in an unregulated manner.

In a further example, the controller 110 controls the frequency of the control signals (period is time between T0 and time T4) to be generated at any suitable frequency.

Additionally, as previously mentioned, the controller 140 controls the pulse duration of the control signals 105 to be around 49% depending on the dead-time duration, although the control signals 105 can be generated at any suitable pulse width modulation value.

A magnitude of the output voltage 123 depends on the multi-tapped autotransformer 160 turns ratio (N1/N2).

Further in this example, the controller 140 produces the respective control signals 105 in each of the multiple control cycles to convert the input voltage into the output voltage. This includes, via the controller 140, for a first portion of a respective control cycle such as between time T0 and time T1 of multiple control cycles: i) activating the switch Q1, activation of the switch Q1 conveys an input voltage 121 received from the input voltage source 120 through the switch Q1 to the first resonant circuit path including capacitor CRES1 and primary winding 161-1; and ii) deactivating the switch Q5, deactivation of the switch Q5 prevents conveyance of the input voltage through the switch Q2 to the second resonant circuit path including the capacitor CRES2 and primary winding 161-2.

Techniques herein further include, via the controller 140 (see also FIG. 9), for a second portion of the respective control cycle such as between time T2 and time T3 of the multiple control cycles: i) deactivating the switch Q1, deactivation of the switch Q1 prevents conveyance of the input voltage 121 through the switch Q1 to the first resonant circuit path, and ii) activating the switch Q5, activation of the switch Q5 conveying the input voltage 121 through the switch Q5 of the second resonant circuit path.

Figure 9:
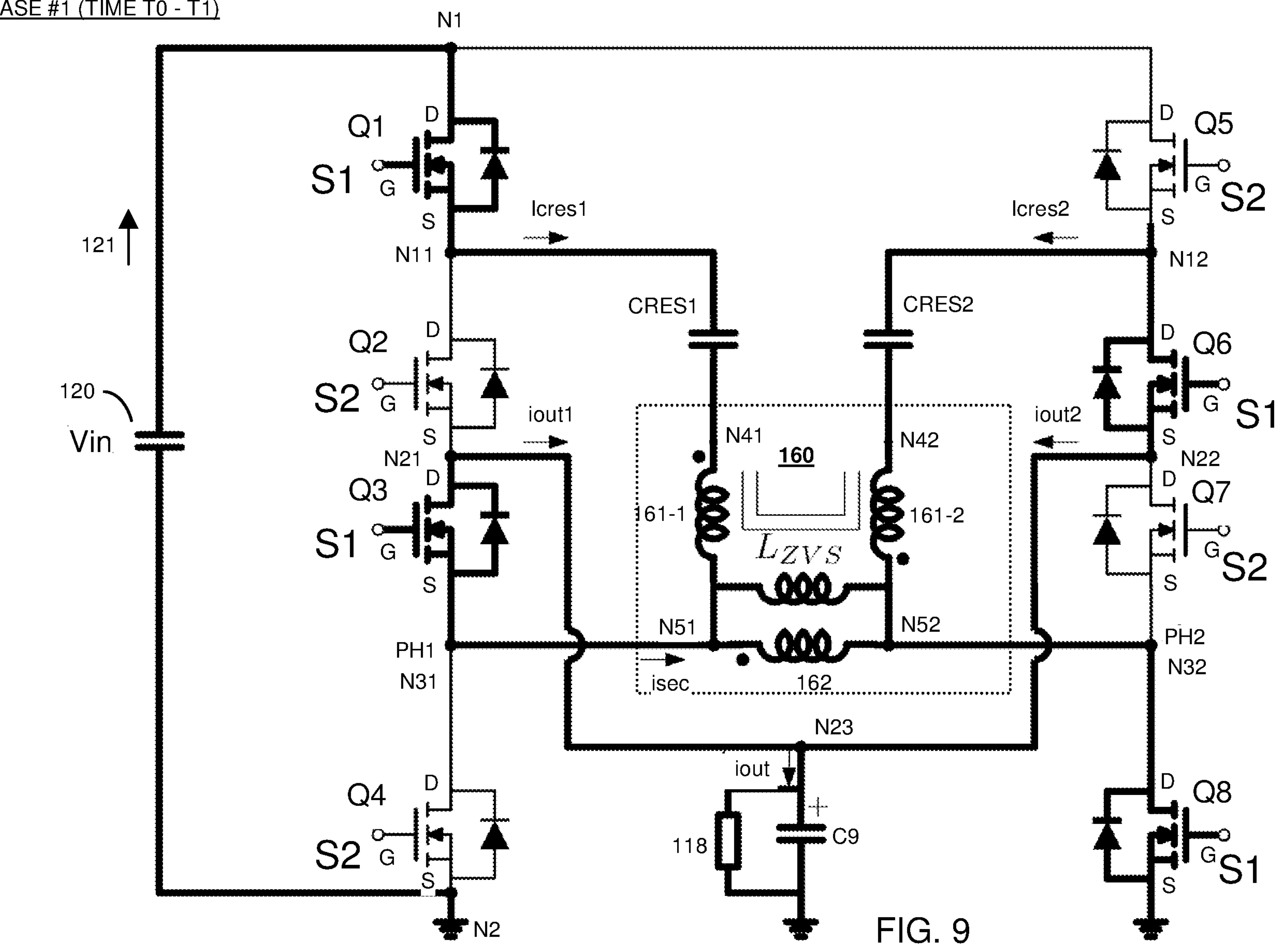
FIG. 9 is an example diagram illustrating operation of the power converter in a first time duration as discussed herein.
Figure 11:
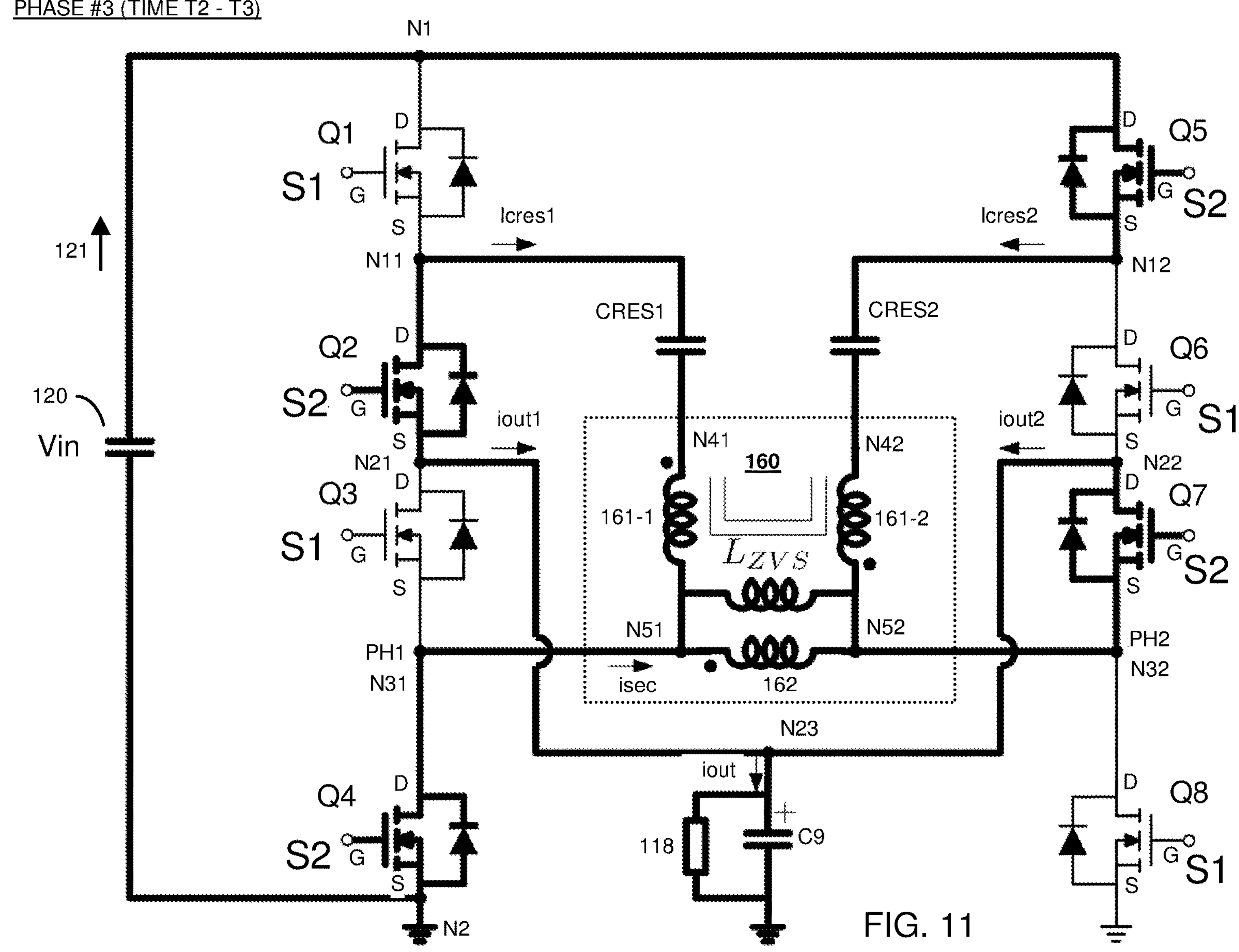
FIG. 11 is an example diagram illustrating operation of the power converter in a third time duration as discussed herein.

Yet further, the controller 140 (see also FIGS. 9 and 11) can be configured to: i) for the first portion of the control cycle such as between time T0 and time T1, in FIG. 9, deactivate the switch Q2 and activate the switch Q6, the activation of the switch Q6 conveys the output current iout2 from node N42 of the transformer 160 (and the second resonant circuit path including winding 161-2 and capacitor CRES2) through the switch Q6 to the output node N23; ii) for the second portion of the control cycle such as between time T2 and time T3, in FIG. 11, deactivate the switch Q6 and activate the switch Q2, the activation of the switch Q2 operable to convey second output current iout1 from the node N41 of the transformer 160 (and the first resonant circuit path including winding 161-1 and capacitor CRES1) through the switch Q2 to the output node N23.

Figure 4:
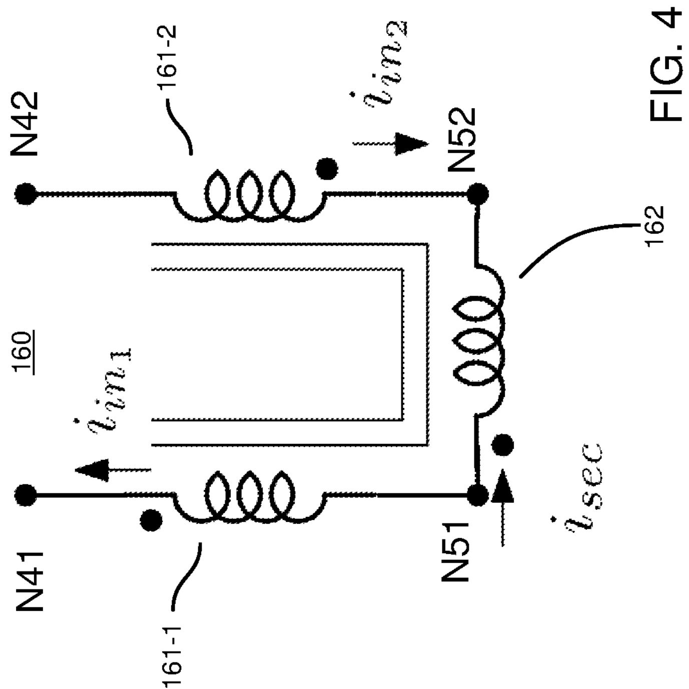
FIG. 4 is an example diagram of an autotransformer implemented in a power converter as described herein.

FIG. 4 is an example diagram of an autotransformer implemented in a power converter as described herein.

As shown in FIG. 4, the multi-tapped autotransformer 160 can be configured to include multiple windings such as primary winding 161-1, primary winding 161-2, and secondary winding 162.

In this example, the windings of the transformer 160 are wound on a magnetic core. The windings can be divided into two windings categories such as a first category including primary winding 161-1 and primary winding 161-2 and the second category including secondary winding 162.

Considering the well-known conventions of the transformer, the "input winding" are considered as primary side windings while the "output winding" are considered as secondary windings. Based on this assumption and if an ideal multi-tapped autotransformer for full-bridge rectifier is considered and considering that the Magneto Motive Force (MMF) is established by current Isec through the secondary side and corresponding secondary winding 162, it should be considered counted by an MMF in the primary established by Iin1 (such as current through the primary winding 161-1) and Iin2 (such as the current through the secondary winding 161-2). In this scenario, the following equation is valid:

N1*Iin1+N1*Iin2=N2*Isec, where N1 equals the number of turns of the primary windings 161 and N2 is the number of turns of the secondary winding 162.

Figure 5:
FIG. 5 to example diagram of an autotransformer implemented in a power converter as discussed herein.
Figure 5:
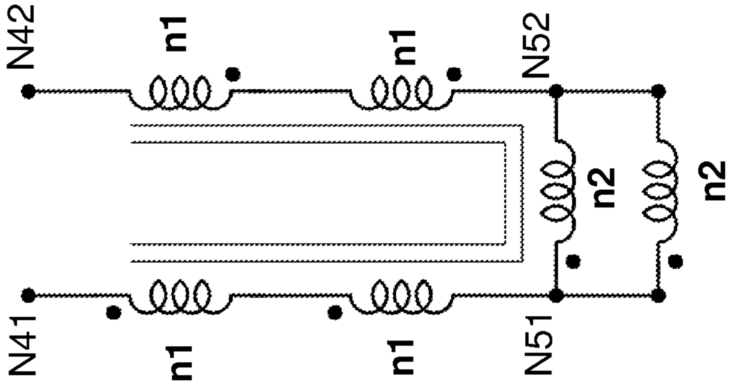

To further increase the performance of the proposed power converter as discussed herein, an alternative instance of the autotransformer 160 can be implemented via the matrix concept as shown in FIG. 5. Note that the matrix version reported in FIG. 5 presents the same equivalent electric circuit depicted in FIG. 4 except with different equivalent transformer ratios.

FIG. 5 to example diagram of an autotransformer implemented in any a power converter as discussed herein.

The autotransformer shown in FIG. 5 is a drop-in replacement for the autotransformer 160 in the power converter 135.

Considering the actual converter ratio, from Equation 1, and the matrix MTA for full bridge rectifier version reported in FIG. 5, the ratio between input and output voltage V_in (121) and output voltage V_out (123) is given by the following equation:

$$V\_in/V\_out = 2+4[M*n1/n2] \qquad \text{Equation 3}$$

Moreover, if an array of matrix multi-tapped autotransformer for full-bridge rectifier is used: n1*x* windings in series and n2*x* windings may be disposed in parallel. By considering M as number of windings connected in series for the input windings nN1x) and in parallel for the output windings n2x, the following equation provides the actual ratio between input voltage V_in and output voltage V_out:

$$V\_in/V\_out = 2 + 2 * [M * n1]/n2 \quad \text{Equation 4}$$

The matrix version of the transformer 160 helps to exploit the horizontal direction of the substrate where the windings are placed rather than the vertical direction (i.e. increase of cost due to layers amount).

Figure 6:
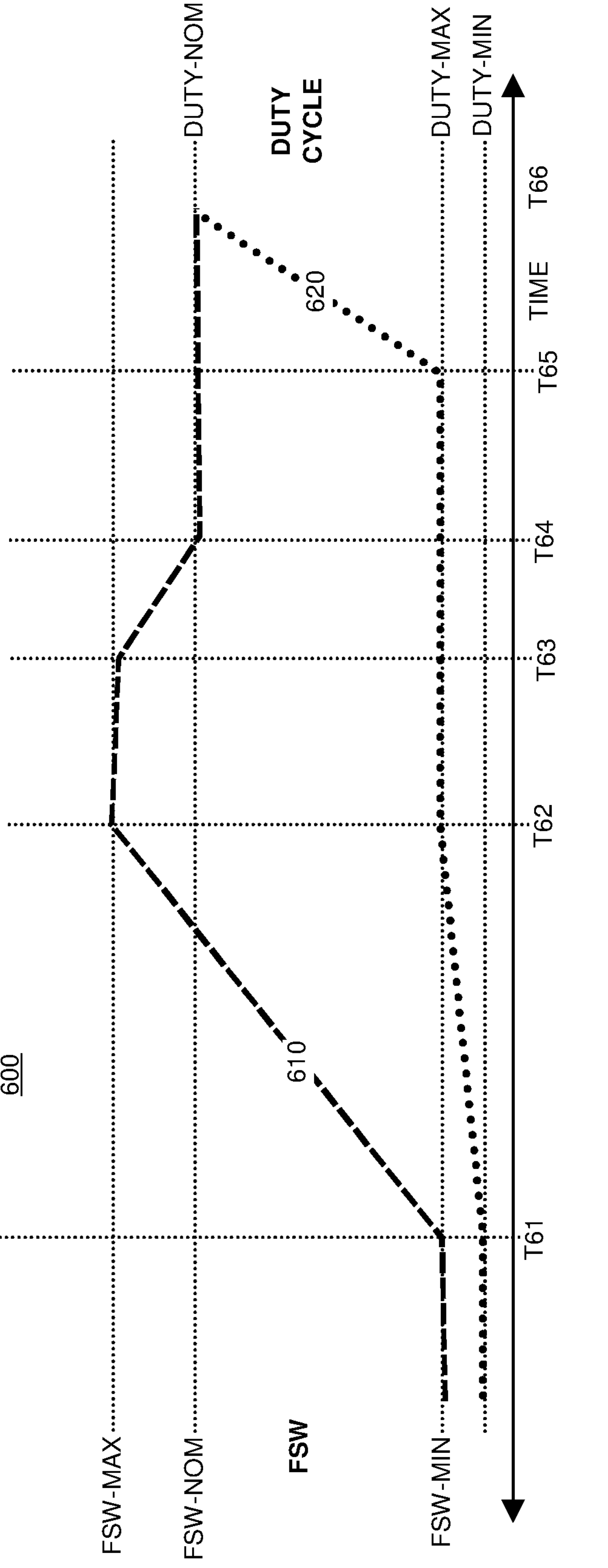
FIG. 6 is an example timing diagram illustrating startup pulse width modulation switching frequency and duty cycle as discussed herein.

FIG. 6 is an example timing diagram illustrating startup pulse width modulation switching frequency and duty cycle as discussed herein.

When a voltage is applied to the input of the power converter 135, the system is in a charge state and the value of the actual inrush current into the converter 135 via the input voltage 121 depends on the impedance of the converter, which presents mainly a capacitive behavior.

As shown in the timing diagram of graph 600, note that the inrush current such as current inputted to the node N1 at startup of the power converter 135 may exceed the current capability of the components and PCB (Printed Circuit Board) traces the power converter 135, resulting in damage to one or more of those components. This problem can be solved and avoided by reducing the voltage rise time on the input (such as input voltage 121) of the power converter 135 during start-up operation of same.

Two different solutions may be adopted such as: 1) voltage regulation at the input (with a buck converter) or 2) with a load switch. In either case, the magnitude of the input voltage 121 inputted to the power converter 135 is ramped up at a desired rate.

The two solutions mentioned can help to manage inrush current from the input voltage source 120 to the node N1 of the power converter 135, however, the management of the inrush current may result in an increase costs to the power supply because additional components may be needed to implement such ramping of the input voltage. One way to ramp the magnitude of the input voltage 121 supplied to the power converter 135 includes basically that SR MOSFETs may be clamped by output voltage value, while TOP FETs (such as switches Q1, Q2, Q5, Q6) are facing part or the entire input voltage during nominal operation (i.e. similar TOP MOSFETs class voltage with and without e-fuse).

The signal 610 in graph 600 indicates a respective switching frequency of controlling the switches in the power converter 135 during startup (such as between time T61 and time T66). The signal 620 in graph 600 indicates a respective duty cycle of controlling the switches in the power converter 135 during startup (such as between time T61 at time T66).

Figure 7:
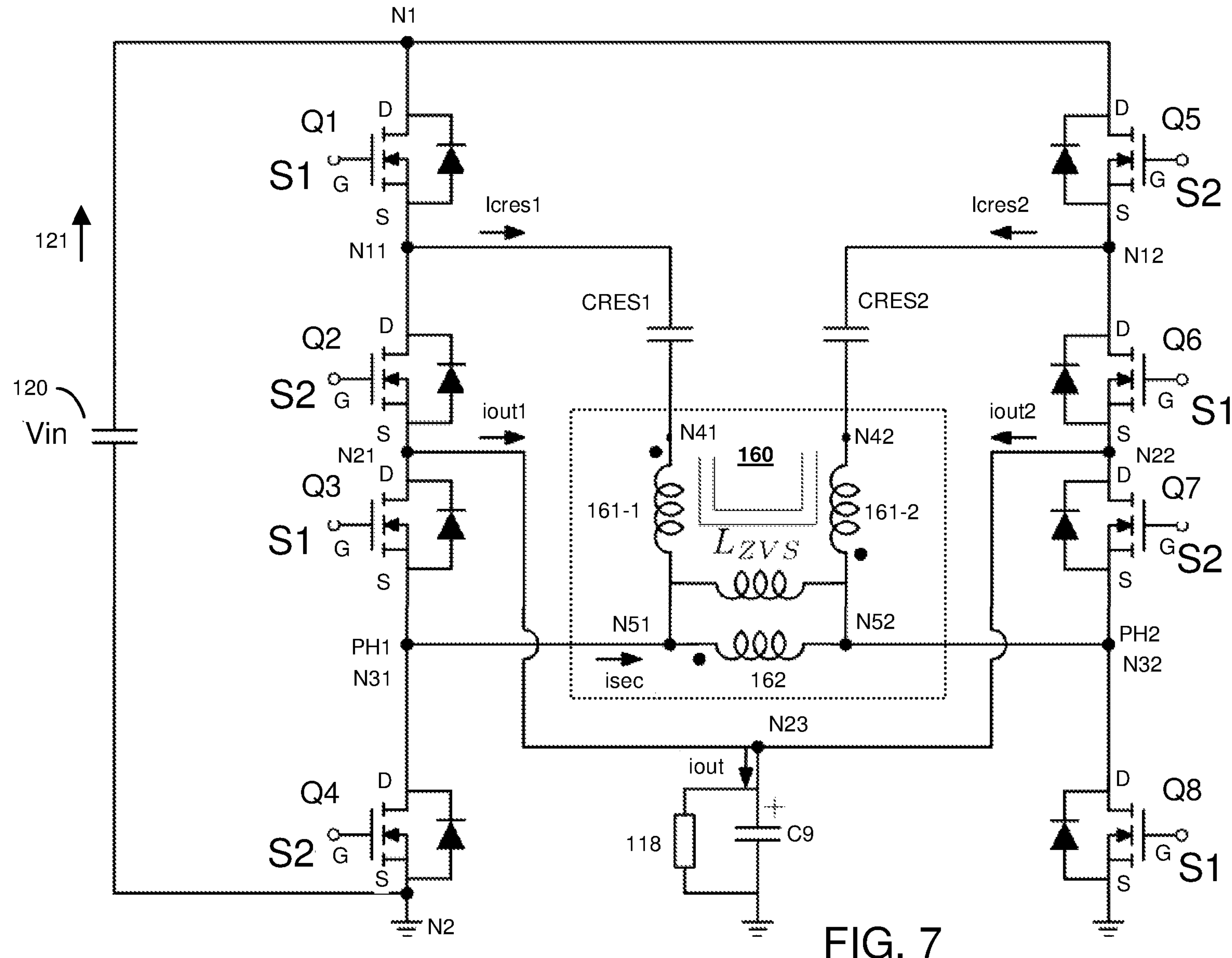
FIG. 7 is an example diagram illustrating a switched capacitor converter with a full bridge rectifier as discussed herein.

FIG. 7 is an example diagram illustrating a switched capacitor converter with a full bridge rectifier as discussed herein.

In this example configuration of the power converter 135, FIG. 7 illustrates the function of a respective zero voltage switching inductor Lzvs associated with the secondary winding 162.

Figure 8:
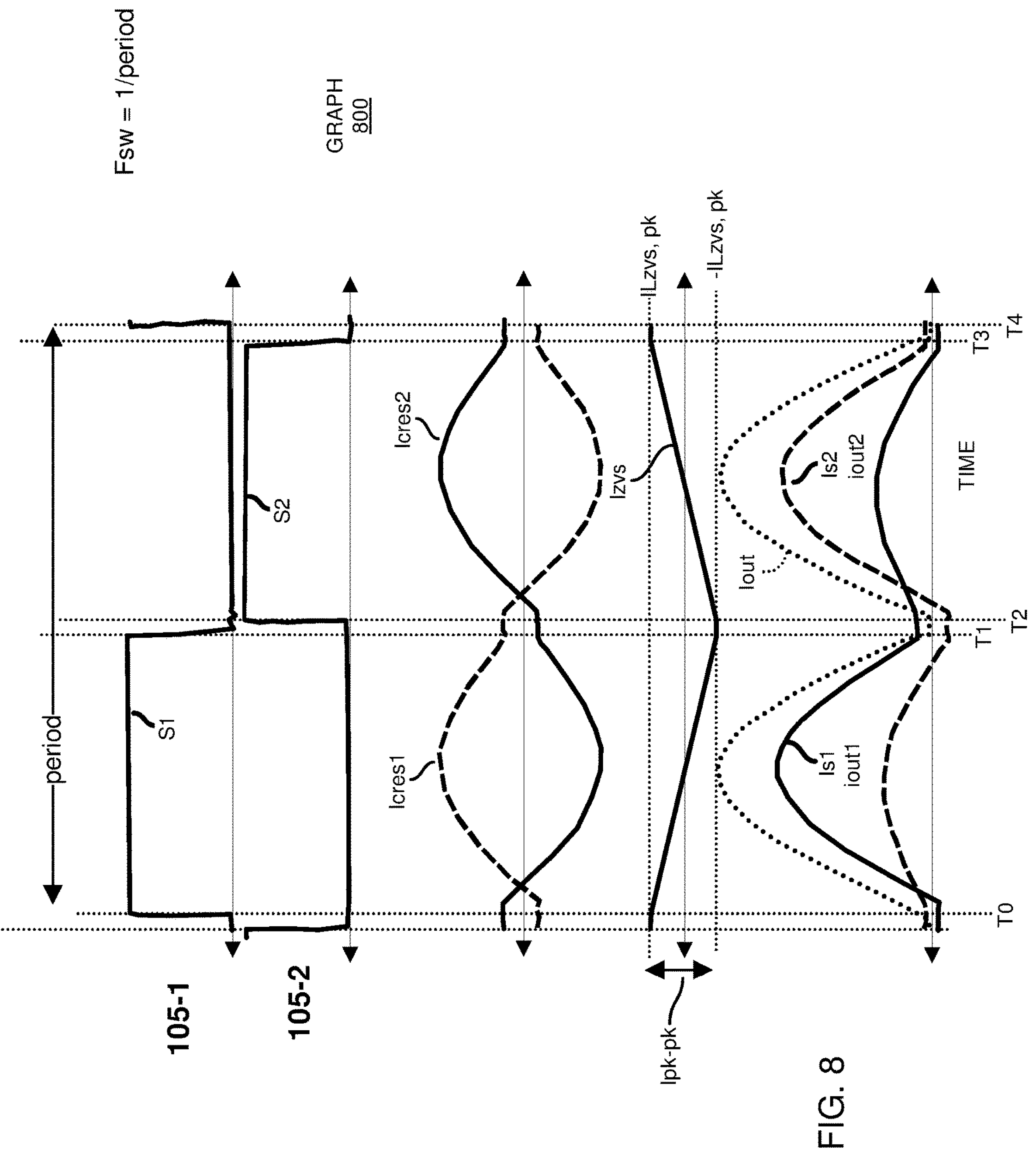
FIG. 8 is an example timing diagram of controlling the power converter and corresponding signals as discussed herein.

FIG. 8 is an example timing diagram of controlling the power converter as discussed herein.

In this example, as shown in graph 800. and as previously discussed, the controller 140 produces the respective control signal S1 (105-1) as well as control signal S2 (105-2) to control the respective switches in the power converter 135.

Signal Icres1 represents current through the series combination of capacitor Cres1 and primary winding 161-1 (first resonant circuit path); Icres2 represents current though the series combination of capacitor Cres2 and primary winding 161-2 (second resonant circuit path).

Izvs represents current through the inductor Lzvs associated with the secondary winding 162.

Signal Iout1 (a.k.a., Is1) represents current supplied from the node and 21 to the output node 123; signal Iout2 (a.k.a., Is2) represents current supplied from node and 22 to the output node 123.

Iout (summation of current Iout1 and current Iout2) represents the total output current (Iout) supplied by the node N23 to the load 118.

Between time T0 and time T1, when the resonant circuit path including capacitor Cres1 and primary winding 161-1 are coupled to input voltage via activation of switch Q1, the corresponding activated switch Q3 supplies output current Iout1 (majority of the output current Iout) to produce the current Iout. Conversely, between time T2 and time T3, when the resonant circuit path including capacitor Cres 2 and primary winding 161-2 are coupled to input voltage via activation of switch Q5, the corresponding activated switch Q7 supplies output current Iout2 (majority of the output current Iout) to produce the current Iout.

FIG. 9 is an example diagram illustrating operation of the power converter in a first time duration (such as between time T0 and time T1) as discussed herein.

As previously discussed, the controller 140 activates the switches Q1, Q3, Q6, Q8 between time T0 and time T1. In one example, the switches Q1, Q3, Q6, and Q8 are turned on with 0 voltage switching ZVSs and 0 current switching ZCSs during which resonant current takes place between the capacitor CRES1 and the leakage inductance of the auto transformer 160, whilst another resonant current takes place between capacitor CRES2 and the leakage inductance of the auto transformer 160. In this phase such as between time T0 and time T1, the capacitor CRES1 is soft-charged from the input voltage source $V_{in}$ (such as via voltage 121) while the capacitor CRES2 is soft-discharged.

When the capacitance of the capacitor CRES1 equals a capacitance of the Capacitor CRES2, the RMS (Route Mean Square) current through each of the capacitors is substantially the same. Considering a substantial balance in magnitudes of current between the resonant currents flowing through the capacitor CRES1 and the capacitor CRES2, the following equation holds:

Icres1 (*t*)=−Icres2 (*t*) and considering Icres1 (*t*)=Ires (t), the two output currents can be $$i_{out1} = -i_{sec} + i_{res} = i_{res}\left(2\frac{N_1}{N_2} + 1\right)$$

$$i_{out2} = i_{res}$$

Therefore, the total output current is:

$$i_{out} = i_{out1} + i_{out2} = i_{res}\left(2\frac{N_1}{N_2} + 2\right)$$

This equation represents the current multiplication factor of the power converter 135 as the input current is always equal to $i_{res}$, the input current is multiplied by M and the input voltage is stepped down by M:

$$M = \frac{V_{in}}{V_{out}} = \left(2\frac{N_1}{N_2} + 2\right)$$

Figure 10:
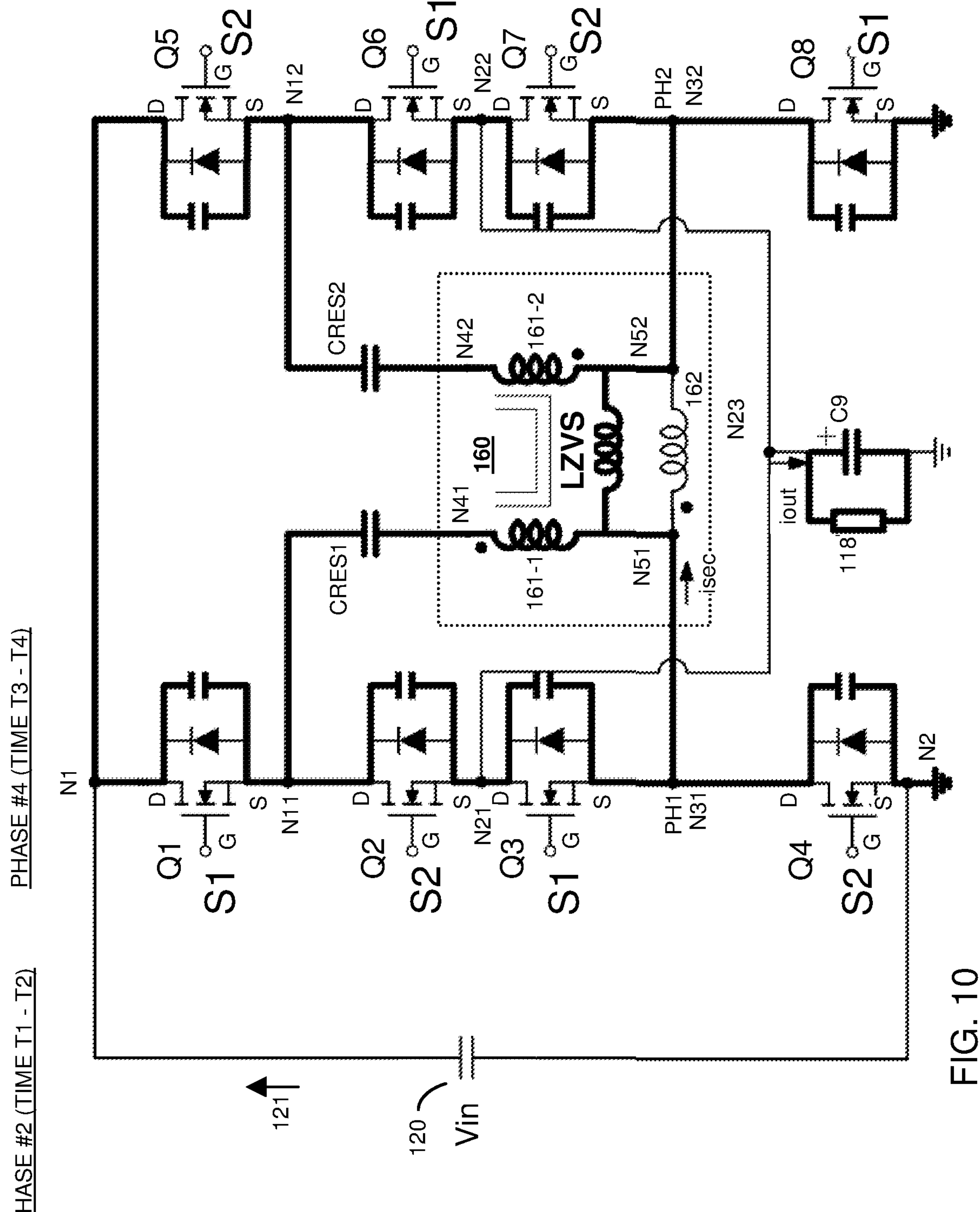
FIG. 10 is an example diagram illustrating operation of the power converter in a second time duration as discussed herein.

FIG. 10 is an example diagram illustrating operation of the power converter in the second time duration (such as between time T1 and time T2 as well as between time T3 and T4) corresponding to a dead time as discussed herein.

For the time duration between time T1 and time T2, the controller 140 deactivates the switches Q1, Q3, Q6, Q8 in addition to deactivating switches Q2, Q4, Q5, Q7. During such time, the energy stored in the parasitic capacitances associated with the switches Q2, Q4, Q5, and Q7, are discharged to zero, using the inductive energy stored in the $L_{zvs}$ inductance at $t=t_1$. When the energy stored in the capacitances associated with switches Q2, Q4, Q5, Q7, is discharged to zero, the respective body diodes associated with the switches starts to conduct enabling ZVS turn on thereafter. The topological state of the switches as shown in FIG. 10. The current $i_{L_{zvs}}(t_1)$ that enables ZVS operation, is denoted as $i_{L_{zvs,pk}}$ as shown in FIG. 8 which is given by the following equation:

$$I_{L_{zvs,pk}} = \frac{V_{out}}{2 * L_{zvs} * f_{sw}}$$

For the time duration between time T3 and time T4, the controller 140 deactivates the switches Q2, Q4, Q5, and Q7 in addition to deactivating switches Q1, Q3, Q6, and Q8. During such time, the energy stored in the parasitic capacitances associated with the switches Q1, Q3, Q6, and Q8, are discharged to zero, using the inductive energy stored in the $L_{zvs}$ inductance at $t=t_3$. When the energy stored in the capacitances associated with switches Q1, Q3, Q6, and Q8, is discharged to zero, the respective body diodes start to conduct enabling ZVS turn on thereafter. The current $i_{L_{zvs}}(t_3)$ that enables ZVS operation is $-i_{L_{zvs,pk}}$.

FIG. 11 is an example diagram illustrating operation of the power converter and a third time duration (such as between time T2 and time T3) as discussed herein.

As previously discussed, between time T2 and time T3, the controller activates the switches Q2, Q4, Q5, Q7 to an ON state in ZVS and in zero current switching (ZCS). A resonant current takes place (flows) between capacitor CRES1 and the leakage inductance of the multi-tapped autotransformer 160, while another resonant current takes place (flows) between capacitor CRES2 and the leakage inductance of the MTA 160. In this phase, the capacitor CRES2 is soft-charged from the input voltage source 120 while the capacitor CRES1 is soft-discharged. When the capacitance of the capacitor CRES1 equals the capacitance of the capacitor CRES2, the RMS current through each of the capacitors is substantially the same. During this balanced current of the resonant currents in $C_{res1}$ and $C_{res2}$, we note that:

$i_{C_{res1}}(t)=-i_{C_{res2}}(t)$ t and considering $i_{C_{res1}}(t)=i_{res}(t)$ the two output currents can be written:

$$i_{out2} = i_{sec} - i_{res} = -i_{res}\left(2\frac{N_1}{N_2} + 1\right)$$

$$i_{out1} = -i_{res}$$

Therefore, the total output current is:

$$i_{out} = i_{out1} + i_{out2} = -i_{res}\left(2\frac{N_1}{N_2} + 2\right)$$

As the input current is now $i_{C_{res2}}=-i_{res}$, the same transformation ratio M previously found is valid.

Thus, the second switches 126 associated with power converter 135 (see FIG. 1) can be configured to include switch Q3 and switch Q7 as well as switch Q4 and switch Q8. The switch Q3 such as corresponding drain node is coupled to a node N51 of the secondary winding 162. The switch Q7 such as corresponding drain node is coupled to node N52 of the secondary winding 162. The second switches 126 as discussed herein may further include switch Q4 and switch Q8. Recall that the switch Q4 such as corresponding drain node is coupled to the node N51 of the secondary winding 162. Additionally, recall that the switch Q8 such as corresponding drain node is coupled to the node N52 of the secondary winding 162.

Yet further, as previously discussed, the output current Iout includes a summation of the output current Iout1 and the output current Iout2. The controller is operative to switch between: i) in a first portion of a respective control cycle, activation of the switch Q3 to convey the output current iout1 from the node N51 of the secondary winding 162 to the output node N23, and ii) in a second portion of the respective control cycle, activation of the switch Q7 to convey the output current iout2 from the node N52 of the secondary winding 162 to the output node N23.

The controller 140 can be configured to configured to: i) activate the switch Q8 in the first portion of the respective control cycle such as between time T0 and time T1; activation of the switch Q8 connects the node N52 of the secondary winding 162 to the ground reference voltage node N2; ii) activate the switch Q4 in the second portion of the respective control cycle such as between time T2 and time T3, activation of the switch Q4 connects the node N51 of the secondary winding 162 to the reference voltage node N2.

In still further examples herein, as previously discussed, the autotransformer 160 includes a first primary winding 161-1 disposed between the node N41 and the node N51. Additionally, the autotransformer 160 includes a secondary winding 162 connected between the node N51 and the node N52. The autotransformer 160 includes a second primary winding 161-2 connected between the node N52 and the node N42 of the autotransformer 160.

As previously discussed, the combination of the first primary winding 161-1, the secondary winding 162 and the second primary winding 161-2 are inductively coupled to each other Further, as previously discussed, the second switches 126 include switch Q3 and switch Q4. Via the control signal S1 applied to the switch Q3, the controller 140 controls conveyance of the first output current Iout1 from the node N51 of the autotransformer 160 through the switch Q3 to the output node N23. Via the control signal S2 applied to the switch Q7, the controller 140 controls conveyance of the second output current Iout2 from the node N52 of the autotransformer 160 through the switch Q7 to the output node N23.

More specifically, the controller 140, for a first portion of each control cycle: i) activates the switch Q1 to an ON state, ii) deactivates the switch Q5 to an OFF state, and iii) activates the switch Q8 to couple the node N52 of the autotransformer 160 to a ground reference voltage node N2. For a second portion of each control cycle, the controller 140: i) activates the switch Q5 to an ON state, ii) deactivates the switch Q1 to an OFF state, and iii) activates the switch Q4 to couple the node N51 of the autotransformer 160 to a ground reference voltage node N2.

Accordingly, first switches (such as switch Q2 and switch Q6) can be configured to convey currents Iout1 and Iout2 from the transformer 160 to the output node N23. The second switches (such as switch Q3 and Q7) can be configured to convey currents Iout1 and Iout2 from the transformer 162 the node N23.

Figure 12:
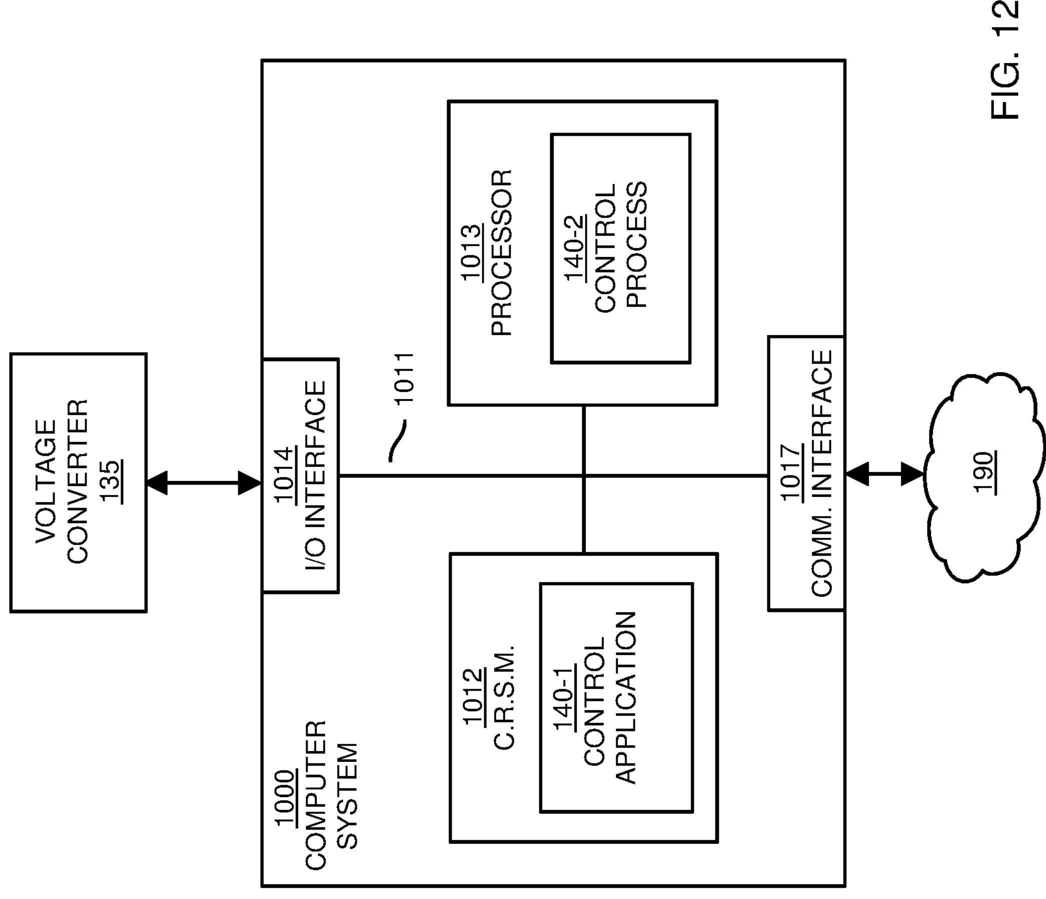
FIG. 12 is an example diagram illustrating computer architecture operable to execute one or more operations according to examples herein.

FIG. 12 is an example block diagram of a computer system for implementing any of the operations as previously discussed according to embodiments herein.

Any of the resources (such as controller 140, voltage converter 135, switched-capacitor converter 131, etc.) as discussed herein can be configured to include computer processor hardware and/or corresponding executable instructions to carry out the different operations as discussed herein.

As shown, computer system 1000 of the present example includes an interconnect 1011 that provides coupling of computer readable storage media 1012 such as a non-transitory type of media (which can be any suitable type of hardware storage medium in which digital information can be stored and retrieved), a processor 1013 (computer processor hardware), I/O interface 1014, and a communications interface 1017. Computer readable storage media can be computer-readable storage hardware.

Computer readable storage medium 1012 can be any hardware storage device such as memory, optical storage, hard drive, floppy disk, etc. In one embodiment, the computer readable storage medium 1012 stores instructions and/or data.

As shown, computer readable storage media 1012 can be encoded with controller application 140-1 (e.g., including instructions) to carry out any of the operations as discussed herein.

During operation of one embodiment, processor 1013 accesses computer readable storage media 1012 via the use of interconnect 1011 in order to launch, run, execute, interpret or otherwise perform the instructions in controller application 140-1 stored on computer readable storage medium 1012. Execution of the controller application 140-1 produces controller process 140-2 to carry out any of the operations and/or processes as discussed herein.

Those skilled in the art will understand that the computer system 1050 can include other processes and/or software and hardware components, such as an operating system that controls allocation and use of hardware resources to execute controller application 140-1.

In accordance with different embodiments, note that computer system may reside in any of various types of devices, including, but not limited to, a power supply, switched-capacitor converter, power converter, a mobile computer, a personal computer system, a wireless device, a wireless access point, a base station, phone device, desktop computer, laptop, notebook, netbook computer, mainframe computer system, handheld computer, workstation, network computer, application server, storage device, a consumer electronics device such as a camera, camcorder, set top box, mobile device, video game console, handheld video game device, a peripheral device such as a switch, modem, router, set-top box, content management device, handheld remote control device, any type of computing or electronic device, etc. The computer system 1050 may reside at any location or can be included in any suitable resource in any network environment to implement functionality as discussed herein.

Functionality supported by the different resources will now be discussed via flowchart in FIG. 13. Note that the steps in the flowcharts below can be executed in any suitable order.

Figure 13:
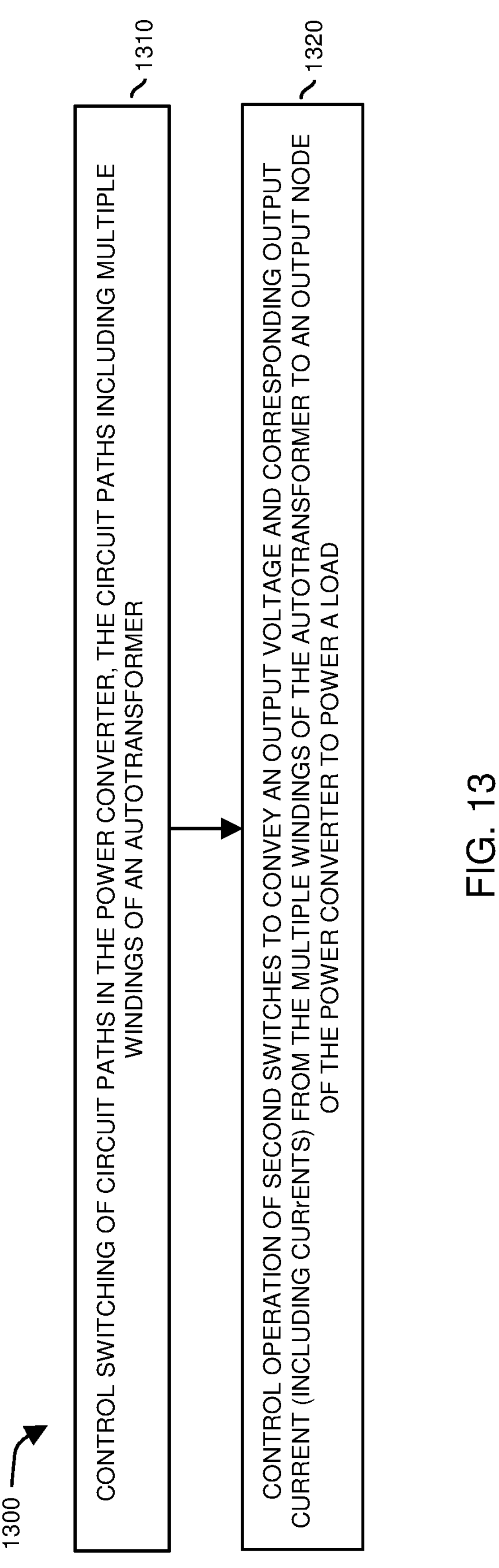
FIG. 13 is an example diagram illustrating a general method according to examples herein.

FIG. 13 is a flowchart 1300 illustrating an example method according to embodiments herein. Note that there will be some overlap with respect to concepts as discussed above.

In processing operation 1310, via generation of the control signals 105-1 and 105-2, the controller 140 controls switching of circuit paths. The circuit path including multiple windings of an autotransformer 160.

In processing operation 1320, the controller 140 controls second switches. The controller 140 controls the second switches to convey output current and a corresponding output voltage from the multiple windings of the autotransformer to an output node to power a load.

Note again that techniques herein are well suited for use in power supply applications. However, it should be noted that embodiments herein are not limited to use in such applications and that the techniques discussed herein are well suited for other applications as well.

While this invention has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting. Rather, any limitations to the invention are presented in the following claims.

The invention claimed is:

1. An apparatus comprising:

an autotransformer including multiple windings;

first switches coupled in series directly between an input node and an output node;

second switches coupled in series directly between a reference potential node and the output node, the reference potential node supplying a reference potential;

wherein the first switches are operable to control switching of circuit paths including the multiple windings of the autotransformer; and wherein the second switches are operable to convey currents received from the multiple windings of the autotransformer through the second switches to the output node.

2. The apparatus as in claim 1, wherein the second switches include a first pair of switches disposed in series and a second pair of switches disposed in series;

wherein the first pair of switches are disposed in series between the reference potential node and the output node; and wherein the second pair of switches are disposed in series between the reference potential node and the output node.

3. The apparatus as in claim 2, wherein the currents include a first current and a second current;

wherein the first pair of switches are operable to control conveyance of the first current from the multiple windings of the autotransformer to the output node; and wherein the second pair of switches are operable to control conveyance of the second current from the multiple windings of the autotransformer to the output node.

4. The apparatus as in claim 1, wherein the currents received from the multiple windings include a first current and a second current;

wherein the input node supplies an input voltage to the first switches;

wherein the first switches include a first switch and a second switch;

wherein the first switch is disposed between the input node and a first circuit path, the first circuit path including a first capacitor disposed in series with a first primary winding of the autotransformer, a combination of the first capacitor and the first primary winding being a first resonant circuit;

wherein the second switch is disposed between the input node and a second circuit path including a second capacitor disposed in series with a second primary winding of the autotransformer, a combination of the second capacitor and the second primary winding being a second resonant circuit, the second primary winding magnetically coupled to the first primary winding;

wherein the autotransformer includes a secondary winding magnetically coupled to both the first primary winding and the second primary winding;

wherein the first circuit path extends between the first switch and a first node of the secondary winding of the autotransformer;

wherein the second circuit path extends between the second switch and a second node of the secondary winding of the autotransformer wherein the second switches include a third switch and a fourth switch;

wherein the third switch is coupled between the first node of the secondary winding and the output node, the third switch operable to control conveyance of the first current from the first node of the secondary winding to the output node; and wherein the fourth switch is coupled between the second node of the secondary winding and the output node, the fourth switch operable to control conveyance of the second current from the second node of the secondary winding to the output node.

5. The apparatus as in claim 4 further comprising:

a controller operative to:

for a first portion of a respective control cycle of multiple control cycles: i) activate the first switch, activation of the first switch operative to convey the input voltage from the input node through the first switch to the first circuit path, and ii) deactivate the second switch, deactivation of the second switch operative to prevent conveyance of the input voltage through the second switch to the second circuit path; and for a second portion of the respective control cycle of multiple control cycles: i) deactivate the first switch, deactivation of the first switch operative to prevent conveyance of the input voltage through the first switch to the first circuit path, and ii) activate the second switch, activation of the second switch operative to convey the input voltage from the input node through the second switch to the second circuit path.

6. The apparatus as in claim 5, wherein the first switches further include a fifth switch and a sixth switch;

wherein the fifth switch is coupled to the first circuit path and the first switch; and wherein the sixth switch is coupled to the second circuit path and the second switch.

7. The apparatus as in claim 6, wherein the controller is further operable to:

for the first portion of the control cycle, deactivate the fifth switch and activate the sixth switch, the activation of the sixth switch operable to convey the second current from the second circuit path through the sixth switch to the output node; and for the second portion of the control cycle, deactivate the sixth switch and activate the fifth switch, the activation of the fifth switch operable to convey the first current from the first circuit path through the fifth switch to the output node.

8. The apparatus as in claim 1, wherein the multiple windings of the autotransformer include multiple primary windings and a secondary winding;

wherein the second switches include a first switch and a second switch, the first switch being directly coupled to a first node of the secondary winding, the second switch being directly coupled to a second node of the secondary winding;

wherein the currents include first current and second current, the apparatus further comprising:

a controller operable to switch between: i) in a first portion of a respective control cycle, activation of the first switch to convey the first current from the first node of the secondary winding through the first switch to the output node, and ii) in a second portion of the respective control cycle, activation of the second switch to convey the second current from the second node of the secondary winding through the second switch to the output node.

9. The apparatus as in claim 8, wherein the second switches further include a third switch and a fourth switch;

wherein the third switch is directly coupled to the first node of the secondary winding, the third switch directly coupled to the first switch and disposed in series with the first switch; and wherein the fourth switch is directly coupled to the second node of the secondary winding, the fourth switch directly coupled to the second switch and disposed in series with the second switch.

10. The apparatus as in claim 9, wherein the controller is further operable to:

i) activate the fourth switch in the first portion of the respective control cycle, activation of the fourth switch operable to connect the second node of the secondary winding to the reference potential node; and ii) activate the third switch in the second portion of the respective control cycle, activation of the third switch operable to connect the first node of the secondary winding to the reference potential node.

11. The apparatus as in claim 1 further comprising:

multiple capacitors including a first capacitor and a second capacitor;

wherein the circuit paths include a first resonant circuit path and a second circuit resonant path, the first resonant circuit path including the first capacitor and a first primary winding of the autotransformer disposed in series, the second resonant circuit path including the second capacitor and a second primary winding of the autotransformer disposed in series;

wherein the autotransformer includes a secondary winding, the secondary winding including a first node and a second node, the first node directly coupling the first primary winding to the secondary winding, the second node directly coupling the second primary winding to the secondary winding; and wherein the second switches include a first switch and a second switch, the first switch coupled between the first node of the secondary winding and the output node, the second switch coupled between the second node of the secondary winding and the output node.

12. The apparatus as in claim 1, wherein the autotransformer is a matrix multi-tapped autotransformer.

13. The apparatus as in claim 1, wherein the autotransformer includes a first primary winding connected between a first node and a second node of the autotransformer;

wherein the autotransformer includes a secondary winding connected between the second node and a third node of the autotransformer;

wherein the autotransformer includes a second primary winding connected between the third node and a fourth node of the autotransformer;

wherein the second switches include a first switch and a second switch;

wherein the currents include a first current and a second current;

wherein the first switch is operable to control conveyance of the first current from the second node of the autotransformer through the first switch to the output node; and wherein the second switch is operable to control conveyance of the second current from the third node of the autotransformer through the second switch to the output node.

14. The apparatus as in claim 13 further comprising:

a controller operative to:

for a first portion of a control cycle: i) activate the first switch to an ON state, ii) deactivate the second switch to an OFF state, and iii) directly couple the third node of the autotransformer to the reference potential node; and for a second portion of the control cycle: i) activate the second switch to an ON state, ii) deactivate the first switch to an OFF state, and iii) directly couple the second node of the autotransformer to the reference potential node.

15. The apparatus as in claim 1, wherein the currents are first currents; and wherein the first switches are operable to convey second currents from the autotransformer through the first switches to the output node.

16. The apparatus as in claim 1, wherein the autotransformer includes two primary windings and a single secondary winding.

17. The apparatus as in claim 1, wherein the currents include a first current and a second current;

wherein the autotransformer includes a first primary winding, a second primary winding, and a secondary winding;

wherein the second switches include a first switch and a second switch;

wherein a first node directly couples a first terminal of the first primary winding to a first terminal of the secondary winding;

wherein a second node directly couples a first terminal of the second primary winding to the secondary winding;

wherein the first switch is operable to control flow of the first current from the first node through the first switch to the output node; and wherein the second switch is operable to control flow of the second current from the second node through the second switch to the output node.

18. The apparatus as in claim 1, wherein the currents include a first current and a second current;

wherein a combination of the first switches and the second switches include: i) a first sequence of a first switch, a second switch, a third switch, and a fourth switch connected in series between the input node and the reference potential node, and ii) a second sequence of a fifth switch, a sixth switch, a seventh switch, and an eighth connected in series between the input node and the reference potential node;

wherein a first node directly couples the first switch to the second switch;

wherein a second node directly couples the second switch to the third switch;

wherein a third node directly couples the third switch to the fourth switch wherein a fourth node directly couples the fifth switch to the sixth switch;

wherein a fifth node directly couples the sixth switch to the seventh switch;

wherein a sixth node directly couples the seventh switch to the eighth switch;

wherein the third switch is operable to control conveyance of the first current through the third switch to the output node; and wherein the seventh switch is operable to control conveyance of the second current through the seventh switch to the output node.

19. The apparatus as in claim 18, wherein the multiple transformer windings include a first primary winding, a second primary winding, and a secondary winding;

wherein the secondary winding is directly connected between the third node and the sixth node;

wherein the circuit paths include a first resonant circuit path and a second resonant circuit path;

wherein the first resonant circuit path includes the first primary winding disposed in series with a first capacitor, the first resonant circuit path extending between the first node and the third node; and wherein the second resonant circuit path includes the second primary winding disposed in series with a second capacitor, the second resonant circuit path extending between the fourth node and the sixth node.

20. An apparatus comprising:

an autotransformer including primary windings and a secondary winding;

multiple switches including a first switch, a second switch, a third switch, and a fourth switch;

multiple nodes including: i) a first node directly coupling the first switch and the second switch in series, and ii) a second node directly coupling the third switch and the fourth switch in series;

wherein the secondary winding is connected between the first node and the second node; and an output node operative to output an output current based on: i) first output current supplied from the first node directly through the first switch to the output node, and ii) second output current supplied from the second node directly through the third switch to the output node.

21. The apparatus as in claim 20 further comprising:

a fifth switch and a sixth switch;

wherein the first switch is disposed in series between the fifth switch and the second switch; and wherein the third switch is disposed in series between the sixth switch and the fourth switch.

22. The apparatus as in claim 21 further comprising:

a first circuit path extending between the fifth switch and the first node, the first circuit path including a first capacitor disposed in series with a first primary winding of the autotransformer; and a second circuit path extending between the sixth switch and the second node, the second circuit path including a second capacitor disposed in series with a second primary winding of the autotransformer.

23. The apparatus as in claim 22 further comprising:

a controller operative to:

for a first portion of a control cycle: i) activate the first switch to an ON state, ii) deactivate the third switch to an OFF state, and iii) activate the fourth switch to directly couple the second node to a reference voltage; and for a second portion of a control cycle: i) activate the third switch to an ON state, ii) deactivate the first switch to an OFF state, and iii) activate the second switch to directly couple the first node to the reference voltage.

24. The apparatus as in claim 23, wherein the controller is further operative to:

for the first portion of the control cycle: i) activate the sixth switch to an ON state, ii) deactivate both the second switch and the fifth switch to an OFF state; and for the second portion of the control cycle: i) activate the fifth switch to an ON state, ii) deactivate both the fourth switch and the sixth switch to an OFF-state.

25. An apparatus comprising:

an autotransformer including multiple windings;

first switches coupled between an input node and an output node;

second switches coupled between a reference potential node and the output node, the reference potential node supplying a reference potential;

wherein the first switches are operable to control switching of circuit paths including the multiple windings of the autotransformer;

wherein the second switches are operable to convey currents received from the multiple windings of the autotransformer through the second switches to the output node;

wherein the currents received from the multiple windings include a first current and a second current;

wherein the multiple transformer windings include a first winding, a second winding, and a third winding;

wherein a first node directly couples the second winding to the first winding;

wherein a second node directly couples the third winding to the second winding; and wherein the second switches include a first switch and a second switch, the first switch operable to control flow of the first current from the first node through the first switch to the output node, the second switch operable to control flow of the second current from the second node through the second switch to the output node.

* * * * *